United States Patent
Sinha et al.

(10) Patent No.: US 8,620,095 B2
(45) Date of Patent: Dec. 31, 2013

(54) PERFORMING STRUCTURE FROM MOTION FOR UNORDERED IMAGES OF A SCENE WITH MULTIPLE OBJECT INSTANCES

(75) Inventors: Sudipta N. Sinha, Redmond, WA (US); Richard Roberts, Atlanta, GA (US); Drew Steedly, Redmond, WA (US); Richard Szeliski, Bellevue, WA (US)

(73) Assignee: Microsoft Corporation, Redmond, WA (US)

( * ) Notice: Subject to any disclaimer, the term of this patent is extended or adjusted under 35 U.S.C. 154(b) by 243 days.

(21) Appl. No.: 13/047,799

(22) Filed: Mar. 15, 2011

(65) Prior Publication Data

US 2012/0237111 A1    Sep. 20, 2012

(51) Int. Cl.
*G06K 9/62* (2006.01)

(52) U.S. Cl.
USPC ........... 382/224; 382/225; 382/154; 382/190; 382/195; 382/103; 345/427; 345/419; 345/E13.02; 345/E13.022

(58) Field of Classification Search
USPC ......... 382/224, 225, 154, 190, 195, 103, 100; 345/427, 419, E13.02, E13.022
See application file for complete search history.

(56) References Cited

U.S. PATENT DOCUMENTS

| | | | |
|---|---|---|---|
| 6,047,078 A | 4/2000 | Kang | |
| 7,158,689 B2 | 1/2007 | Valleriano et al. | |
| 7,359,526 B2 * | 4/2008 | Nister | 382/100 |
| 2008/0013836 A1 | 1/2008 | Nakamura et al. | |
| 2010/0214288 A1 | 8/2010 | Xiao et al. | |

OTHER PUBLICATIONS

Snavely et al: "Skeletal graphs for efficient structure from motion", IEEE Conference on Computer, 2008.*
Snavely, et al., "Scene reconstruction and visualization from community photo collections",Retrieved at <<http://www.cs.washington.edu/homes/iansimon/papers/internet_vision.pdf>>, Proceedings of the IEEE | vol. 98, No. 8, Aug. 2010, pp. 1370-1390.
Barinova, et al., "On detection of multiple object instances using hough transforms",Retrieved at<<http://research.microsoft.com/en-us/um/people/pkohli/papers/blk_cvpr2010.pdf>>, Jul. 19, 2010, pp. 8.
Sabatta, et al., "Improved appearance-based matching in similar and dynamic environments using a vocabulary tree", Retrieved at<<http://robotics.ethz.ch/~scaramuzza/Davide_Scaramuzza_files/publications/pdf/ICRA10_sabatta.pdf>>, May 2010, pp. 6.
Collet, et al., "Object recognition and full pose registration from a single image for robotic manipulation", Retrieved at<<http://www.cmu.edu/qolt/Research/publications/2009Pubs/collet_icra09_final.pdf>>, 2009, pp. 8.

(Continued)

*Primary Examiner* — Ruiping Li (57) ABSTRACT

A technology is described for performing structure from motion for unordered images of a scene with multiple object instances. An example method can include obtaining a pairwise match graph using interest point detection for obtaining interest points in images of the scene to identify pairwise image matches using the interest points. Multiple metric two-view and three-view partial reconstructions can be estimated by performing independent structure from motion computation on a plurality of match-pairs and match-triplets selected from the pairwise match graph. Pairwise image matches can be classified into correct matches and erroneous matches using expectation maximization to generate geometrically consistent match labeling hypotheses and a scoring function to evaluate the match labeling hypotheses. A structure from motion computation can then be performed on the subset of match pairs which have been inferred as correct.

20 Claims, 6 Drawing Sheets

(56) References Cited

OTHER PUBLICATIONS

Sturgess, et al., "Combining appearance and structure from motion features for road scene understanding", Retrieved at<<http://eprints.pascal-network.org/archive/00005448/01/sturgess09.pdf>>, 2009, pp. 11.
Multi-stage linear structure from motion.
Schaffalitzky, et al., Multi-View Matching for Unordered Image Sets, or "How do I Organize My Holiday Snaps?", Retrieved at<<http://www.robots.ox.ac.uk/~vgg/publications/papers/schaffalitzky02.pdf>>, pp. 17.
Snacely, et al., "Photo Tourism: Exploring Photo Collections in 3D", Retrieved at<<http://citeseerx.ist.psu.edu/viewdoc/download;jsessionid=08ACF40C5EB93A32BBF43A60E1161C2A?doi=10.1.1.62.910&rep=rep1&type=pdf>>, pp. 12.
Martinee, et al., "Robust Rotation and Translation Estimation in Multiview Reconstruction", Retrieved at<<http://citeseerx.ist.psu.edu/viewdoc/download?doi=10.1.1.88.2067&rep=rep1&type=pdf>>, In Proceedings of the Computer Vision and Pattern Recognition conference 2007, IEEE, Minneapolis, MN, USA, Jun. 2007, pp. 10.
Havlena, et al., "Randomized Structure from Motion Based on Atomic 3D Models from Camera Triplets", Retrieved at http://ieeexplore.ieee.org/stamp/stamp.jsp?tp=&arnumber=5206677, 2009, pp. 2874-2881.
Sinha, et al., "A Multi-Staged Linear Approach to Structure from Motion", Retrieved at<<http://research.microsoft.com/pubs/138039/Sinha-RMLE10.pdf>>, pp. 14.
Govindu, Madhav Venu., "Robustness in Motion Averaging", Retrieved at<<http://www.umiacs.umd.edu/users/venu/accv06final.pdf>>, pp. 10.
Zach, et al., "What Can Missing Correspondences tell us about 3D Structure and Motion?", Retrieved at<<http://citeseerx.ist.psu.edu/viewdoc/download?doi=10.1.1.142.2952&rep=rep1&type=pdf>>,2008, pp. 8.
Zach, et al., "Disambiguating Visual Relations Using Loop Constraints",Retrieved at<<http://www.inf.ethz.ch/personal/chzach/pdf/cvpr2010-preprint.pdf>>, 2010, pp. 10.
Govindu, Madhav Venu., "Lie-Algebraic Averaging for Globally Consistent Motion Estimation", Retrieved at<<http://ieeexplore.ieee.org/stamp/stamp.jsp?tp=&arnumber=1315098>>, Proceedings of the 2004 IEEE Computer Society Conference on Computer Vision and Pattern Recognition (CVPR'04), 2004, pp. 8.
Changchang, et al., "Modeling and Recognition of Landmark Image Collections Using Iconic Scene Graphs", Retrieved at<<http://www.cs.unc.edu/~xwli/publication/eccv08.pdf, 2010, pp. 1-14.
Wilson, Bruce David., "Generating Random Spanning Trees More Quickly than the Cover Time", Retrieved at <<http://citeseerx.ist.psu.edu/viewdoc/download?doi=10.1.1.47.8598&rep=rep1&type=pdf, 1996, pp. 8.
Peres, Yuval., "Course Notes: Probability on Trees and Networks", Retrieved at<<http://stat-www.berkeley.edu/~peres/notes1.pdf>>, 2004, pp. 1-54.
Uyttendaele, et al., "Image-Based Interactive Exploration of Real-World Environments", Retrieved at<<http://ieeexplore.ieee.org/stamp/stamp.jsp?arnumber=01297011>>, May/Jun. 2004, pp. 52-63.
Courchay, et al.,"Exploiting loops in the graph of trifocal tensors for calibrating a network of cameras", Retrieved at <<In ECCV (2), 2010, p. 85-99.
Dempster, et al., "Maximum Likelihood from Incomplete Data via the EM Algorithm", Retrieved at<< http://web.mit.edu/6.435/www/Dempster77.pdf>>,Journal of the Royal Statistical Society. Series B (Methodological), vol. 39, No. 1, pp. 1-38,1977.
Fischler, et al., "Random Sample Consensus: A Paradigm for Model Fitting with Applications to Image Analysis and Automated Cartography",Retrieved at<<http://www.ai.sri.com/pubs/files/836.pdf>>,1981, pp. 381-395.

Gil, et al., "Improving Data Association in Vision-based SLAM", Retrieved at<<http://arvc.umh.es/documentos/articulos/iros_2006.pdf>>, Proceedings of the 2006 IEEE/RSJ International Conference on Intelligent Robots and Systems , Oct. 9-15, 2006,pp. 2076-2081.
Govindu, Madhav, Venu, "Lie-algebraic Averaging for Globally Consistent Motion Estimation",Retrieved at <<http://citeseerx.ist.psu.edu/viewdoc/download;jsessionid=A508F064A1EFOF7DC5A185D3E5BAA812?doi=10.1.1.10.6216&rep=rep1&type=pdf,2004, pp. 1-8.
Govindu, Madhav, Venu, "Robustness in Motion Averaging",Retrieved at<<http://www.umiacs.umd.edu/users/venu/accv06final.pdf>>,pp. 10.
Hahnel, et al., Towards Lazy Data Association in SLAM , Retrieved at<<http://www.informatik.uni-freiburg.de/~burgard/postscripts/haehnel-isrr03.pdf,2003,pp. 11.
Havlena, et al., "Randomized Structure from Motion based on Atomic 3D Models from Camera Triplets",Retrieved at<<http://ieeexplore.ieee.org/stamp/stamp.jsp?tp=&amumber=5206677,2009, pp. 2874-2881.
Horn, et al., "Closed-form Solution of Absolute Orientation using Orthonormal Matrices" , Retrieved at<<http://www.cs.hunter.cuny.edu/~ioannis/horn-hilden-orientation-josa88.pdf, pp. 36,1987.
Changchang, et al., Modeling and Recognition of Landmark Image Collections using Iconic Scene Graphs , Retrieved at<<http://www.cs.unc.edu/~xwli/publication/eccv08.pdf>>,ECCV '08 Proceedings of the 10th European Conference on Computer Vision: Part I, 2008,pp. 14.
Martinec, et al., "Robust Rotation and Translation Estimation in Multiview Reconstruction" , Retrieved at<<http://citeseerx.ist.psu.edu/viewdoc/download;jsessionid=E6B8BA703077C72D771BFCAAD69C8DB7?doi=10.1.1.88.2067&rep=rep1&type=pdf,In Proceedings of the Computer Vision and Pattern Recognition conference 2007, pp. 10.
Nister, David, "An Efficient Solution to the Five-point Relative Pose Problem", Retrieved at<<http://citeseerx.ist.psu.edu/viewdoc/download?doi=10.1.1.129.1518&rep=rep1&type=pdf,Jun. 2004, pp. 17.
Olson, et al., "Fast Iterative Optimization of Pose Graphs with Poor Initial Estimates (Title Mismatch)", Retrieved at<< http://rvsn.csail.mit.edu/graphoptim/eolson-graphoptim2006.pdf,May 2006, pp. 8.
Schaffalitzky, et al., Multi-view Matching for Unordered Image Sets, or "How do I Organize my Holiday Snaps?", Retrieved at<<http://www.robots.ox.ac.ukt~vgg/publications/papers/schaffalitzky02.pdf,in ECCV '02: Proceedings of the 7th European Conference on Computer Vision—Part I, 2002, pp. 414-431.
Sinha, et al., "A Multi-staged Linear Approach to Structure from Motion" , Retrieved at<<http://research.microsoft.com/pubs/138039/Sinha-RMLE10.pdf, Sep. 2010, pp. 14.
Snavely, et al., "Photo Tourism: Exploring Photo Collections in 3D" ,Retrieved at<<http://citeseerx.ist.psu.edu/viewdoc/download-?doi=10.1.1.62.910&rep=rep1&type=pdf,2006,pp. 12.
Triggs, et al., "Bundle Adjustment—A Modern Synthesis",Retrieved at<<http://lear.inrialpes.fr/pubs/2000/TMHF00/Triggs-va99.pdf, 2000, pp. 1-71.
Wilson David Bruce, "Generating Random Spanning Trees more quickly than the Cover Time", Retrieved at<<http://citeseerx.ist.psu.edu/viewdoc/download?doi=10.1.1.51.2761&rep=rep1&type=pdf, STOC '96 Proceedings of the twenty-eighth annual ACM symposium on Theory of computing, 1996, pp. 8.
Zach, et al., "What can Missing Correspondences tell us about 3D Structure and Motion?", Retrieved at<<http://citeseerx.ist.psu.edu/viewdoc/download?doi=10.1.1.142.2952&rep=rep1&type=pdf, in Proceedings IEEE Conference on Computer Vision and Pattern Recognition (CVPR'08), 2008, pp. 8.
Zach, et al., "Disambiguating Visual Relations using Loop Constraints",Retrieved at<<http://www.inf.ethz.ch/personal/chzach/pdf/cvpr2010-preprint.pdf,IEEE Computer Society Conference on Computer Vision and Pattern Recognition, 2010, pp. 1-9.

* cited by examiner

PERFORMING STRUCTURE FROM MOTION FOR UNORDERED IMAGES OF A SCENE WITH MULTIPLE OBJECT INSTANCES

BACKGROUND

Most existing structure from motion (SFM) approaches for reconstructing three-dimensional (3D) scene geometry from unordered images generally have serious difficulty handling multiple instances of the same structure in a scene. One problem that occurs with duplicate structure is that large self-consistent sets of geometrically valid pairwise (or triplet-wise) image matches between instances can be in fact incorrect. Previous work towards addressing this issue has primarily used geometric reasoning about the consistency of relative camera pose estimates. Such previous methods work better when there is relatively less ambiguity in pairwise matches or work in datasets where the incorrect matches are random and not self-consistent.

One family of geometric reasoning approaches is based on reasoning about large-scale structure instead of just pairwise matches, hoping that errors in data association causing conflicting measurements at a global scale can be discovered. For example, in FIG. 1A-1D, by looking only at small neighborhoods of matches, it is unclear whether the matches across the two oat boxes are correct, or if the conflicting matches between the oat boxes and the square box are correct. Indeed, the former outnumber the latter. By looking at the measurements in the entirety, at least the conflict between these two sets of edges can be detected. When image pairs that contain different instances of a duplicate structure are matched based on visual similarity, the resulting pairwise geometric relations as well as the correspondences inferred from such pairs can be erroneous, which can lead to catastrophic failures in the reconstruction.

SUMMARY

This summary is provided to introduce a selection of concepts in a simplified form that are further described below in the detailed description. This summary is not intended to identify key features or essential features of the claimed subject matter, nor is it intended to be used to limit the scope of the claimed subject matter. While certain disadvantages of prior technologies are noted above, the claimed subject matter is not to be limited to implementations that solve any or all of the noted disadvantages of the prior technologies.

Various example embodiments are described for performing structure from motion for unordered images of a scene with multiple object instances. An example method can include obtaining a pairwise match graph using interest point detection for interest points in images of the scene to identify pairwise image matches using the interest points. Multiple metric partial reconstructions can be estimated by performing independent structure from motion computation on a plurality of match-pairs and match-triples selected from the pairwise match graph. Pairwise image matches can be classified into correct matches and erroneous matches using expectation maximization to evaluate geometric consistency and a scoring function to evaluate match labeling hypotheses. A further operation can be applying a global geometric consistency analysis to the pairwise image matches. A structure from motion computation can then be performed on the subset of match pairs that have been inferred as correct.

An example system for performing structure from motion for unordered images of a scene with multiple object instances can also be provided. The system can include a mass storage device to store images obtained from a camera taken during a single time period. A match graph computation module can obtain a pairwise match graph generated by using interest point detection in the images to enable pairwise matching of images. A scene reconstruction module can estimate multiple metric partial reconstructions by performing independent structure from motion computation on match-pairs and match-triples selected from the pairwise match graph. Image match-pairs can be classified into correct matches and erroneous matches by a classification module using expectation maximization to generate geometrically consistent match labeling hypotheses and a scoring function to evaluate such a match labeling hypothesis. In addition, a structure from motion module can perform a structure from motion computation on the subset of match pairs which have been inferred as correct matches.

DETAILED DESCRIPTION

Reference will now be made to the exemplary embodiments illustrated in the drawings, and specific language will be used herein to describe the same. It will nevertheless be understood that no limitation of the scope of the technology is thereby intended. Alterations and further modifications of the features illustrated herein, and additional applications of the embodiments as illustrated herein, which would occur to one skilled in the relevant art and having possession of this disclosure, are to be considered within the scope of the description.

Structure from Motion (SFM) is the problem of jointly estimating scene structure (i.e., three dimensional (3D) points) and camera poses from an unordered set of images. Typical SFM methods can robustly match features in as many pairs of input images as possible, thereby recovering measurements of the relative rigid camera poses between camera pairs. Bundle adjustment operations can then compute a maximum likelihood estimate of the camera poses and point locations, after initialization using a subset of the pairwise measurements. In existing SFM pipeline approaches, the implicit "data association" method has the underlying assumption that there is just a single instance of any structure in the scene. In SFM, "data association" is the problem of determining correspondences, either between feature points or whole images. In the case of whole images, data association can be seen as the validity of hypotheses that image pairs contain sets of matching features corresponding to the same 3D points.

Figure 1A:
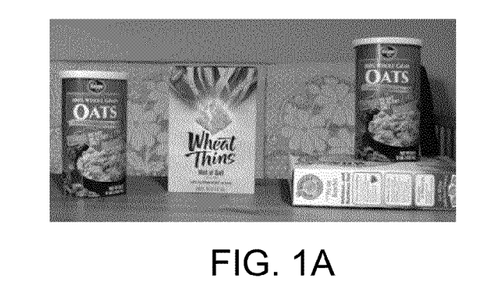
FIG. 1A is an image illustrating an example of multiple instances of an object in a scene.

When multiple large structures are similar in 3D shape and appearance, for example as shown in FIG. 1A, this assumption breaks down. This causes the pipeline to believe that two or more separate objects or structures are in fact the same, or to "mix and match" data associations between instances, which often gives rise to folded or ghost structures. This is often a problem in architectural scenes.

Figure 1B:
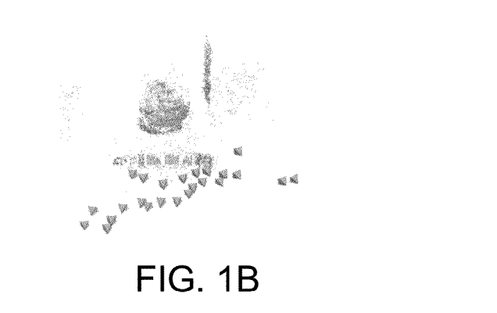
FIG. 1B is an image illustrating an example of multiple instances of an object in a scene that results in a folded reconstruction.
Figure 1C:
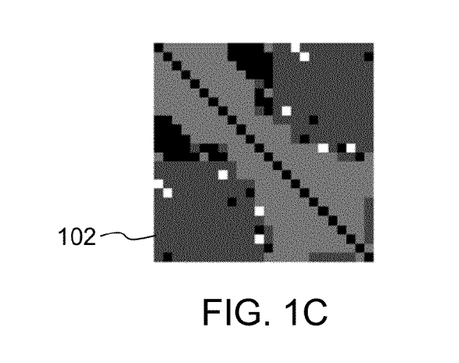
FIG. 1C is a match adjacency matrix illustrating an example of erroneous pairwise image matches in a scene.
Figure 1D:
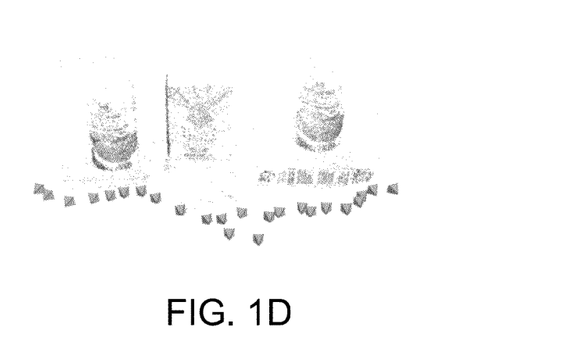
FIG. 1D illustrates an example of an accurate reconstruction of a scene.

In FIGS. 1A and 1B, two identical objects in the scene result in a folded reconstruction. Specifically, FIG. 1B shows that multiple instances of an object have caused the image to be folded upon itself when using existing SFM processes. In contrast, the present technology can produce an accurate reconstruction shown in FIG. 1D by inferring the erroneous matches, shown in dark gray 102 in the match graph adjacency matrix of FIG. 1C.

In such cases, the relative pose estimates between the cameras involved in an erroneous match pair, as well as the data association of the observed image features inferred from the erroneous match pair are incorrect. With large duplicate structures, the erroneous match pairs can form large, self-consistent sets, as shown in FIGS. 1 and 4. Without additional knowledge of the structure that has multiple instances, there is a lack of a direct way to infer that a particular small subset of the match pairs is correct whereas a much larger subset is incorrect. To avoid minor data association errors, existing SFM pipelines have been augmented with initialization techniques that use smart heuristics for greedily choosing match pairs. Nonetheless, these heuristics have not been able to exclude large coherent sets of inter-instance erroneous matches. In other words, the geometric ambiguities in structure and motion caused by the presence of multiple object instances in the scene mean that without additional information, an approach based on global geometric reasoning may be unable to reliably disambiguate between different hypotheses within a family of reconstructions.

The described technology can include a method for performing structure from motion for a collection of unordered images of a scene that contains multiple identical object instances. The correct data association between pairs of images can be determined. An initial assumption is that a set of geometrically consistent pairwise image matches is initially obtained, some of which may be incorrect inter-instance matches. The task is to then determine which of these matches are correct and which are erroneous. Incorrect pairwise matches between images can be inferred, and an incorrect match pair can refer to a pair of matched images with two different instances of identical structure or duplicate object instances that have been observed. For scenes with repeated elements or containing duplicate objects, this technology can automatically determine the erroneous matches and avoid using the erroneous matches while performing structure from motion computation. This process can make structure from motion more robust with respect to catastrophic failures.

An example method and system can be provided for inferring the erroneous match pairs. This technology can bring in additional evidence derived from cues based on pairwise match statistics such as image time-stamp, missing correspondences, etc., and these cues can be combined with the global approach based on geometric consistency of pairwise pose estimates in order to perform the inference. In comparison to previous work in structure from motion that addresses the problem of duplicate or repeated structure, this method can handle a significantly larger number of erroneous match pairs.

The described approach can be based on an expectation maximization (EM)-based method, which can jointly estimate camera poses and infer the false match-pairs in conjunction with an efficient sampling method to discover plausible data association hypotheses. This can allow the correct data association to be recovered, even in the presence of a large numbers of erroneous pairwise matches that are highly correlated with each other.

This approach can work within a probabilistic framework where one of the computational challenges is in searching the exponential data association search space. Using efficient random graph algorithms can provide an approach to efficiently sample plausible hypotheses within this large search space. Accordingly, this approach can efficiently find a correct solution with high probability. But in cases where the degree of ambiguity is higher, this approach can enumerate multiple likely solutions.

It is also possible to resolve data association ambiguities using the features that are matched between two images but are not detected in a third image. If a portion of observed image features match between two images but not a third, it is more likely that two of the images observe the same instance of structure while the third image observes a different instance. This reasoning is performed locally on camera triplets. This cue can be included in this technology and combined with the additional image cues and global geometric reasoning.

This technology can provide the ability to characterize the geometric ambiguities that are present while performing structure from motion in the presence of duplicate structures or object instances. The assumption made in previous work of statistically independent erroneous pair works in some cases but not in every case. Specifically, the assumption can fail in the presence of large duplicate structures when many more erroneous pairs tend to be correlated.

A high level overview of the technology using an example method and system will now be described for performing structure from motion for unordered images of a scene with multiple object instances. A more detailed description of the underlying details for performing the method and the system operation will follow this initial higher level overview.

Figure 2:
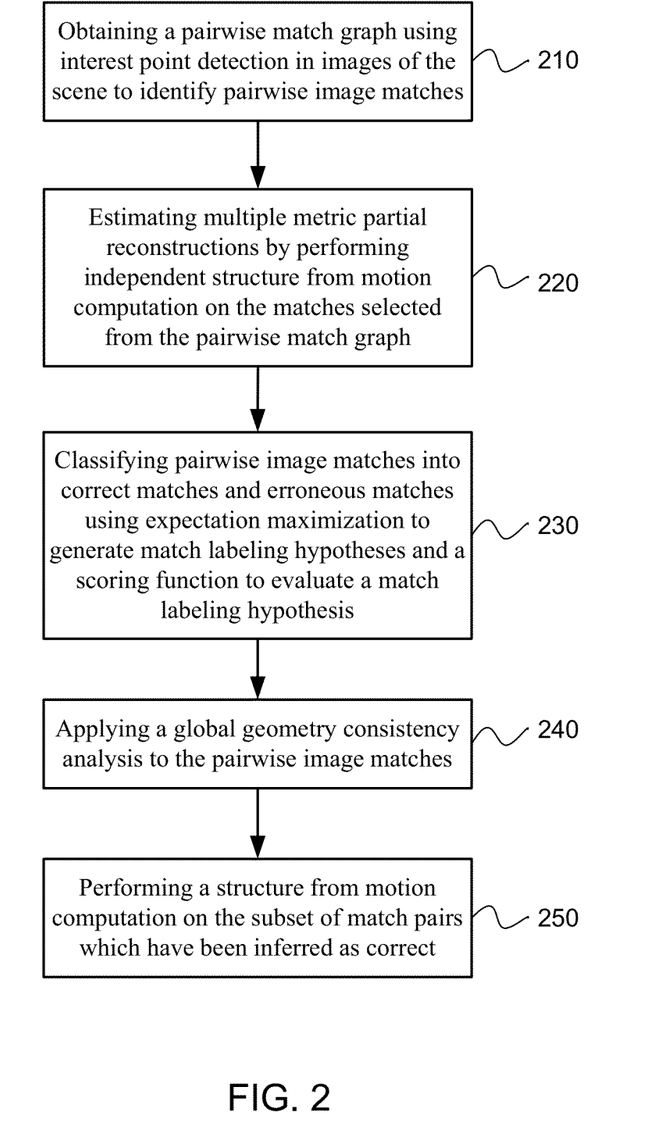
FIG. 2 is a flowchart illustrating an example method of performing structure from motion for unordered images of a scene with multiple object instances.

FIG. 2 illustrates a method for performing structure from motion for unordered images of a scene with multiple object instances. The images can be unordered as compared to video that have sometimes been used in the past when working with structure from motion, and the images can be taken by a single camera during a single time period.

The method can include the operation of obtaining a pairwise match graph using interest point detection for interested points in images of the scene to identify pairwise image matches using the interest points, as in block 210. Nodes can be created in the pairwise match graph that represent an image, and each edge in the pairwise match graph can represent matched images. The pairwise match graph can estimate a relative camera pose, including rotation and translation of the plurality of cameras with respect to one another. The pairwise match graph can include sets of geometrically verified two-dimensional (2D) feature point correspondences for the pairwise matches. The intrinsic camera parameters can be obtained in advance or when the images are initially captured.

A further operation can be estimating multiple metric two-view and three-view partial reconstructions by performing independent structure from motion computation on a plurality of match-pairs and match-triplets selected from the pairwise match graph, as in block 220. Then the pairwise image matches can be classified into correct matches and erroneous matches using expectation maximization to generate match labeling hypotheses and a scoring function to evaluate a match labeling hypothesis, as in block 230. To evaluate the geometric consistency, random minimal hypotheses based on randomly sampling spanning trees from the pairwise match graph can be generated. The pairwise match graph can also be an undirected graph. Building the spanning trees can include generating a spanning tree that has an incomplete labeling. Then the match labeling can be completed for the set of pairwise matches that were not included in the spanning tree using an expectation maximization operation. The expectation maximization operation can jointly refine the camera pose estimates based on pairwise pose measurements. In addition, the match labeling can perform a joint estimation of the global camera rotations, full camera poses, and an inference of incorrect or erroneous match pairs. If the pairs selected in the spanning tree are assumed to be correct, then this estimation operation can also infer which of the remaining match-pairs are geometrically inconsistent with the estimated camera poses and hence erroneous.

The match labeling can be created that includes a binary labeling of the set of match pairs, wherein a binary label for each match pair indicates whether a corresponding match pair is correct or erroneous. Further, a scoring function can be used to evaluate the match labeling hypothesis to identify the match labeling hypothesis with a high score that can be inferred as a correct solution.

The global geometric consistency analysis can be applied to the pairwise image matches, as in block 240. Applying a global geometric consistency analysis can utilize pairwise relative rotation estimates derived from the pairwise image matches, and translations which use three-view partial constructions of several triplets of images. Then a structure from motion computation can be performed on the subset of match pairs that have been inferred as correct, as in block 250.

Figure 3:
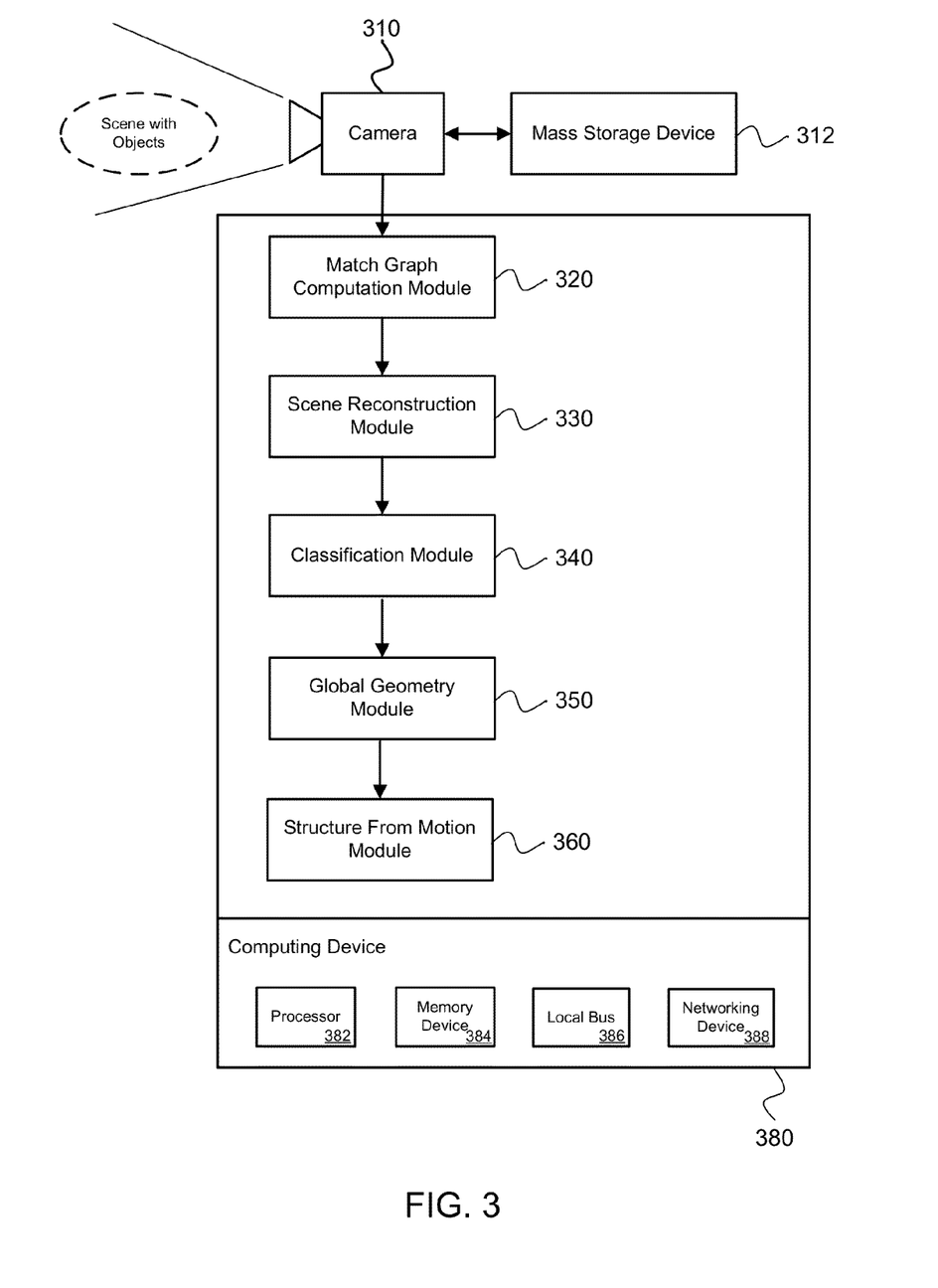
FIG. 3 is a block diagram illustrating an example of a system for performing structure from motion for unordered images of a scene with multiple object instances.
Figure 4A:
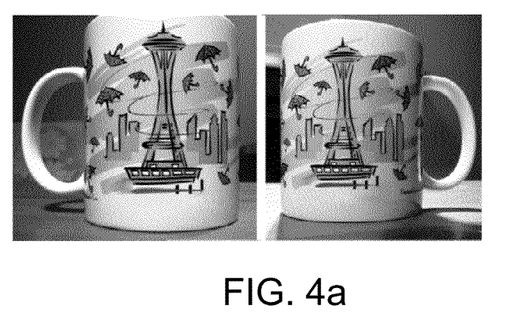
FIG. 4A is an image illustrating an example of a cup with a 180 degree symmetry.
Figure 4B:
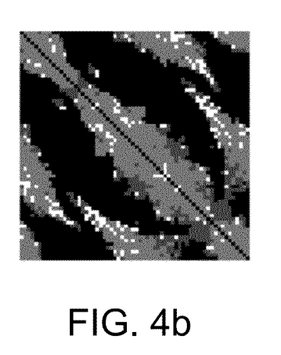
FIG. 4B is an image illustrating an example of a match association matrix for a folded reconstruction.
Figure 4C:
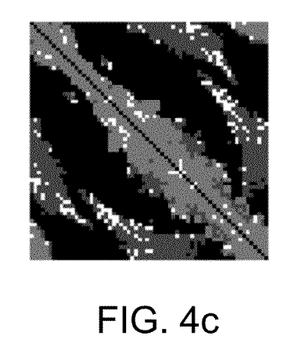
FIG. 4C is an image illustrating an example of a correct match association matrix.
Figure 4D:
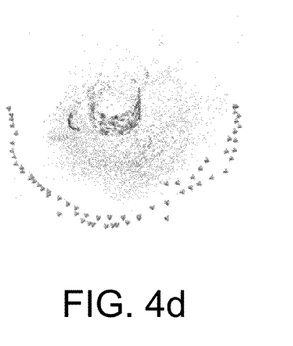
FIG. 4D is an image illustrating an example of an incorrect folded reconstruction.
Figure 4E:
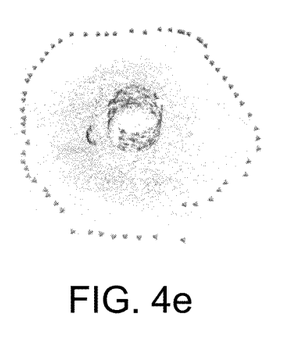
FIG. 4E is an image illustrating an example of a correct reconstruction.

FIG. 3 illustrates an example system for performing structure from motion for unordered images of a scene with multiple object instances. The system can include a mass storage device 312 to store images and measurements obtained from a camera 310 taken during a single time period.

A match graph computation module 320 can obtain a pairwise match graph generated by using interest point detection for interest points in the images to enable pairwise matching of images. In addition, a scene reconstruction module 330 can estimate multiple metric two-view and three-view partial reconstructions by performing independent structure from motion computation on several match-pairs and match-triplets selected from the pairwise match graph.

A classification module 340 can classify image match-pairs into correct matches and erroneous matches using expectation maximization and a scoring function to evaluate a match labeling hypotheses. In one example, the classification module can generate random minimal hypotheses based on randomly sampling spanning trees from the pairwise match graph that is an undirected graph. Other existing methods for generating random spanning trees can also be used to obtain random minimal hypotheses.

A match labeling can also be derived for a set of pairwise matches in the pairwise match graph using an expectation maximization that results in a binary labeling of the set of pairwise matches. The label for each match pair can indicate whether the match pair is a correct match or erroneous match. A scoring function can evaluate a match labeling hypothesis and identify a match labeling hypothesis with a highest score that is a correct solution.

A global geometry module 350 can apply a global geometric consistency analysis to the image match pairs. A structure from motion module 360 can perform a structure from motion computation on the subset of match pairs that have been inferred as correct matches.

The system described and the relevant modules 320-360 may be executing on a computing device that comprises a server, a workstation, local processing for a robot, local processing for an artificial vision device, or another computing node type. The computing device can include a hardware processor device 382, a hardware memory device 384, a local communication bus 386 to enable communication between hardware devices and components, and a networking device 388 for communication across a network with other compute nodes, processes on the compute nodes, or other computing devices.

Consistent Majority Optimization

An underlying probabilistic model upon which the present technology builds will now be described. The probabilistic model is for finding correct and erroneous pairwise image matches and an associated inference method. This serves as one component of a unified method for which additional components will be described at a later point. This model labels erroneous matches that are geometrically inconsistent with the majority of the other measurements that redundantly involve the same images. This model by itself is not typically able to solve any but the easiest cases of duplicate structure because the model assumes that the erroneous matches are statistically independent of each other.

A measurement model can first be described. A set of putative pairwise image matches is obtained with their associated camera transformations, which are geometrically consistent with a rigid camera transformation. Then the desire is to infer which pairwise image matches are correct. Thus, a generative model is developed for these matches that can include hidden correct/erroneous indicator variables.

In the model, the $i^{th}$ measurement supposing the measurement is between the $j^{th}$ and $k^{th}$ cameras, is generated as the relative pose between them plus Gaussian noise, $$z_i \sim N(x_j^{-1} x_k, \Sigma(y_i)) \tag{Eq. 1}$$

where $x_j$ and $x_k$ are the poses of the $j^{th}$ and $k^{th}$ cameras, respectively, and the measurement is $z_i$. $\Sigma(y_i)$ is a covariance matrix representing noise on each of the camera translation directions and rotation axes. The noise can be modeled on each measurement as a mixture of Gaussian "inlier" and "outlier" densities. When $y_i=1$, $\Sigma(y_i)$ is the inlier covariance, which comes directly from the pairwise reconstructions. When $y_i=0$, $\Sigma(y_i)$ is the outlier covariance, which is chosen to be large (uniform 1 rad variance can be used for rotation and 0.5 for the unit translations).

In the first stage of this method, just the camera rotations are used to avoid scale ambiguity, in which case $x_j$, $x_k$, and $z_i$ are members of the 3×3 matrix Lie group of rotations SO (3). In the second stage, full cameras poses can be modeled by registering view triplets as described in the section below about inferring camera poses via triplets, in which case $x_j$, $x_k$, and $z_i$ are members of the 4×4 matrix Lie group of 3D rigid transformations SE (3).

The Gaussian mixture model makes the probability density on the camera poses in general non-Gaussian. However, when the model is conditioned on the hidden indicator variables y, the distribution is Gaussian up to linearization error.

When the measurements are correct, the unknown poses can be recovered by solving a nonlinear least squares problem on the pose graph (a.k.a. the match graph). Since some matches are erroneous, an expectation-maximization method can jointly estimate the poses and the probabilities of each match being correct.

Iterative Inference Using EM

Finding the global optimum over the poses $x_j$ and the indicator variables $y_i$ can involve an intractable search over all of combinations of y. Instead, the latent variable model can use an expectation-maximization (EM) method, which finds a locally optimal solution. The EM method can refer to expectation maximization and may involve iteratively applying a E-step (expectation step) and M-step (maximization step). This method is described later with random restarts, which are more likely to find the global optimum.

EM can maximize the expectation over the latent variables of the log-likelihood function, at each iteration, computing the expectation using the previous estimate of the parameters, $$x^t = \text{argmax}_x \sum_i \sum_{y^i} \langle L(x_j, x_k | z_i, y_i) \rangle_{y_i | x^{t-1}, z_i} \quad \text{(Eq. 2)}$$

This leads to the update equations $$x^t = \text{argmax}_x L(x) + \quad \text{(Eq. 3)}$$
$$\sum_i \langle y_i \rangle^{t-1} \|z_i^{-1} x_j^{-1} x_k\|_{\Sigma_t}^2 + (1 - \langle y_i \rangle^{t-1}) \|z_i^{-1} x_j^{-1} x_k\|_{\Sigma_t}^2$$

$$\langle y_i \rangle^t = \frac{N(z_i^{-1} x_j^{-1} x_k; 0, \sum_t) p(y_i = 1)}{\sum_{y_{ij}} N(z_i^{-1} x_j^{-1} x_k; 0, \sum_{y_i}) p(y_i)} \quad \text{(Eq. 4)}$$

where p (y) is a prior on the probability of an edge being correct. An uninformative prior can be used or the prior can be specified beforehand or estimated online.

Inferring 6-DOF Camera Poses via Triplets

The inference method described above is defined and valid both for camera rotations in SO (3) and for full camera poses (rotation and translation) in SE (3). However, due to the inherent scale ambiguity in 3D reconstructions, the relative scale between any pair of pairwise relative translations is unknown. One way to handle this can be to use triplet measurements that constrain relative but not global scale. Because this can add a layer of complexity both to the problem definition and implementation, a simpler method of resolving scale can be used that actually over-counts some measurements. Performing a full bundle adjustment (using the original feature measurements) after removing erroneous matches yields a final SFM solution that is not affected by this overcounting.

First triplet reconstructions can be performed, then a tree of triplet reconstructions spanning the cameras can be chosen and the tree can be traversed while rescaling each child triplet to be consistent in scale with its parent. During an M-step (Maximization step) update of $x^t$, each triplet reconstruction can be treated as a set of three pairwise relative pose measurements (one from each pair in the triplet). Amongst multiple measurements for a camera pair, the measurement with the minimum residual can be used. During an E-step (Expectation Step), a probability of being correct for each triplet can be computed, by first computing a similarity transformation which can align each triplet reconstruction with the current pose estimates, and then computing the probability of the residual between the camera positions of the scaled and current poses. However, any method of pose optimization and uncertainty representation may be used to evaluate the updates in Eqs. (3) and (4). For example, a Lie group variant of these equations can be used, which allows uncertainty to be specified in axis-angle form.

Difficulties Caused by Multiple Instances

The model just described above assumes statistically independent outliers. Unfortunately, the erroneous match pairs that occur due to large duplicate structures form large, coherent sets. These erroneous sets in general overwhelm the correct matches and appear as inliers, while the smaller sets of correct matches appear as outliers. It is helpful to understand the difficulties caused by multiple instances in SFM and how the implicit single instance assumption arises. An example of how large coherent sets of erroneous image matches form can be shown, and this can explain why modeling erroneous edges as statistically independent leads to the implicit single instance assumption and an incorrect cost function. The large number of erroneous matches can make discovering the correct solution difficult using naïve sampling methods.

In order to understand how the modeling of erroneous edges as statistically independent leads to the implicit single instance assumption, an example can be provided. FIG. 4 shows an "orbit" sequence with a 180 degree radial symmetry. Matches between nearby cameras can be correct, but matches across the circle can confuse the two sides of the cup as the same structure and cause the reconstruction to fold in half. The assumption of statistically independent outliers in this previously existing model implicitly results in the assumption of one instance of any scene structure. The independent-outlier model can assume a lower cost to break the correct edges than to break the erroneous ones. In order to fold the reconstruction, the few matches at the "fold points" of the folded reconstruction can be broken (marked as erroneous), as seen in the dark gray entries along the diagonal of the match matrix in FIG. 4B. In contrast, to unfold the reconstruction, the matches across the circle can be broken, as can be seen in the dark gray entries of the match matrix in FIG. 4C. The independent outlier model implicitly imposes a nearly-fixed (but actually dependent on the measurement uncertainty) penalty per edge broken (i.e., marked as erroneous), so the largest coherent set of edges overwhelms any edges not consistent with it. The previously existing model can be suitable when erroneous edges occur randomly due to match errors, degenerate point configurations, or other uncorrelated random processes.

Correlated outliers are just one problem to be addressed. In addition to using a scoring function that behaves correctly, a good inference method can also discover the correct solution. Exhaustive search can be intractable and unfortunately local search methods (such as the EM algorithm presented previously) are susceptible to becoming stuck in local minima. Although random sampling methods are useful for solving problems with local minima, the coherent erroneous matches again cause a problem for naïve sampling methods. If random spanning trees are sampled, for instance, then it may become increasingly unlikely to sample a tree with no erroneous matches. There is an example of this from the ratio of dark gray erroneous edges to light gray correct edges along any given row of the right-hand match matrix in FIGS. 4B and 4C.

In order to choose a correct hypothesis, a sampler can roughly choose two correct matches for every image, a probability that decreases dramatically as the number of images increases.

Combining Image Cues with Global Geometric Reasoning

This technology includes an approach that combines image cues with global geometric reasoning to label pairwise image matches as correct or erroneous. Minimal configurations of data associations can be sampled, and from these samples a local search can be performed for complete match validity and camera pose configurations. To address the issue of incorrect solutions appearing more likely than the correct one, the image cues can be used in formulating a likelihood function such that the correct configuration is more likely. To efficiently discover the correct configuration, image cues can be applied as a heuristic to guide the sampling process.

Figure 5:
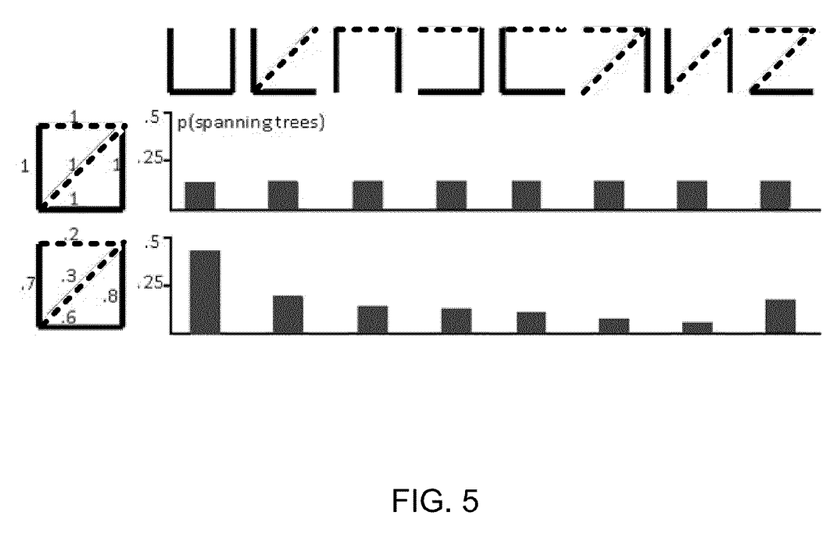
FIG. 5 is a chart illustrating an example of a pairwise match graph and related spanning trees.

FIG. 5 illustrates an example of a pairwise match graph and its spanning trees where black edges are correct while dotted edges are erroneous. When spanning trees are sampled uniformly (upper histogram), the probability of choosing one with no erroneous edges is low. In contrast, by weighting the edges according to evidence on their correctness, it becomes much more likely to sample a spanning tree with only correct edges.

For structure from motion, this technology can be applied in two stages. In the first stage, global camera orientations are estimated using pairwise relative rotation measurements. Subsequently, rotation and translation can be estimated using pre-computed camera triplets and the extension previously described. For computing relative pairwise pose and triplet reconstructions, existing techniques can be employed. Finally, the pairs inferred as erroneous can be removed and the remaining match pairs can be used in a state of the art structure from motion pipeline with standard bundle adjustment to compute the final reconstruction.

Sampling Minimal Hypotheses

The spanning trees can be sampled and the sampling can produce minimal hypotheses with which to estimate camera poses. A spanning tree containing no erroneous matches can be sufficient to generate a complete correct solution after including other matches that are consistent with the spanning tree. As in FIG. 5, the probability of sampling such a spanning tree from a uniform process is very low, and becomes exponentially more so as the number of matches increases, even if the fraction of correct edges remains the same. The ability to sample a correct spanning tree in a reasonable amount of time includes the ability to define a probability density over spanning trees in which correct trees are more likely and to sample from this probability density.

The method for generating random spanning trees according to a specific distribution is based on previous methods and work based on random graph theory. The distribution over spanning trees can be defined by a weight on each edge, and the probability of each spanning tree can be proportional to the product of the spanning tree's edge weights. To specify a distribution over spanning trees that may be more likely to include correct matches, edge weights can be specified according to how likely each edge is to be correct.

At least two image cues can be combined to form the edge weights. One such cue can be a missing correspondence cue. For image pairs that observe the same structure instance, portions of the rest of the scene, such as the background, may also be likely to match. Otherwise, it becomes more likely that the match is between separate instances. A modified missing correspondence cue can be used to incorporate a weighting determined by the spatial density of features in the image.

For the j-th image, the feature points matched to many or all the other images are denoted by $x_j$, out of which those matched in the k-th image are denoted by $X_{jk}$. The fraction of correspondences in image j missing in image $$k \text{ is } 1.0 - \frac{|x_{jk}|}{|x_j|}.$$

To discount for other sources of missing correspondences (noise, occlusion, low repeatability of interest points), the spatial statistics of the missing features in the image can be modeled by computing a measure of backgroundness. For each point u in $X_j$, not in $X_{jk}$, the distances $\{d_{ur}\}$ to its R (e.g., R=20) nearest neighbors in $X_{jk}$ in the images can be computed. The backgroundness of the point u can then be obtained by computing a weighted sum $$b_u = \left(\frac{1}{n}\right) \sum_r^R (1 - \exp(-d_{ur}/\sigma)).$$

The spatially weighted fraction can then be computed, $$f_{jk} = \frac{|x_{jk}|}{n^*},$$

where $$n^* = |X_{jk}| + \sum_{u \notin X_{jk}} b_u.$$

Figure 6:
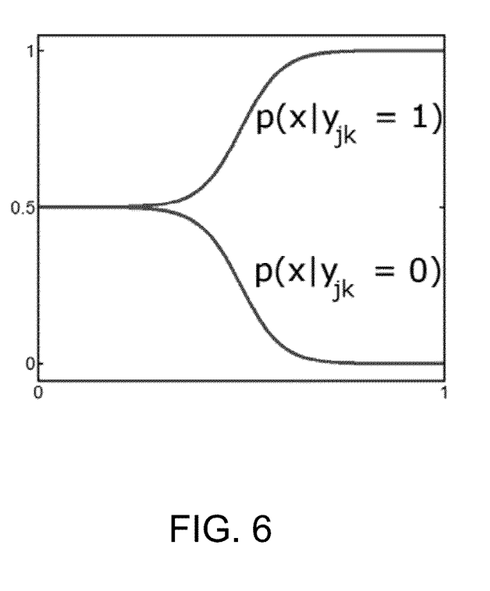
FIG. 6 is a chart illustrating an example of conditional distributions for probabilities for match pair cues for correct and erroneous pairs.

Finally, the missing correspondence measure for the pair jk can be computed as $M_{jk}=\max(f_{jk}; f_{kj})$. The distributions (see FIG. 6)

$$p(M_{jk}|y_{jk}=1)=0.05(1+1/(1+\exp(-\alpha(M_{jk}-\beta)))) \quad \text{(Eq. 5)}$$

$$p(M_{jk}|y_{jk}=0)=(1-p(M_{jk}|y_{jk}=1)) \quad \text{(Eq. 6)}$$

can be used to model the conditional distribution $p(M_{jk}|y_{jk})$ for correct and erroneous pairs where $\alpha=20$ and $\beta=0.5$.

Another image cue that can be used is an image timestamp cue. Modern digital cameras can record timestamps in their EXIF (Exchangeable Image File Format) tags. Among the matches with a certain image, pairs relatively closer in time are less likely to be erroneous. The time cue in many cases can allow an approximate time sequence for unordered image sets to be recovered. This assumes a single photographer scenario and does not apply to other cases such as randomly captured photos downloaded from the internet. A likelihood that a match is correct can be calculated based on the timestamp cue according to the ratio between the time difference of the match and the smallest time difference of any match involving one of the cameras, i.e., compute $$q_{jk} = \frac{\min_l \{t_{jl}\}}{t_{jk}}.$$

The time cue for pair jk is then $T_{jk}=\max(q_{ik}, q_{kj})$ and the model $p(T_{jk}|y_{jk})$ can be used as described above but with $\alpha$ and $\beta$ set to 10 and 0.25 respectively. Finally, edge weights for pair jk are computed as $$w_{jk} = \frac{p(M_{jk} | y_{jk} = 1)p(T_{jk} | y_{jk} = 1)}{p(M_{jk} | y_{jk} = 0)p(T_{jk} | y_{jk} = 0)} \quad \text{(Eq. 7)}$$

where $M_{jk}$ and $T_{jk}$ are computed as described above.

Completing the Match Labeling

Given each sampled minimal hypothesis, the complete set of matches consistent with the hypothesis can be found and the estimated camera poses can be refined. In the next step, the hypothesis can be scored and then finally the hypothesis with a high score or the highest score can be selected. For efficiency, after sampling a large number of spanning trees as described in the previous operation, the duplicate spanning trees can be removed using a binary hashing scheme before scoring the spanning trees.

To complete the pairwise match labeling and refine the camera poses, the EM method described above can be applied with modifications. To find the match pairs consistent with the sampled spanning tree, the indicator variables $y_{jk}$ for the spanning tree edges are set to 1 so that they are counted as inliers in the EM solution. To run the EM method in the case of camera rotations, the camera poses can be initialized simply by composing relative rotations along the edges of the spanning tree. Pose initialization in the case of triplets is similar but can use a few additional steps. First, a minimal subset of edges in the original match graph can be computed such that edges in the subset are shared by at least two different triplets, also ensuring that every node in the graph is covered by the subset. Random spanning trees can be sampled from this graph, where the edge weights are identical to those used for rotations. For each random spanning tree, the subset of all tree-induced triplets can be found (i.e., triplets for which two of its edges are part of the spanning tree). If these tree-induced triplets form a connected set and cover the cameras, triplet chaining can be performed via a breadth-first traversal of the graph of tree-induced triplets. However, if the set of triplets is not connected, additional triplets can be selected in order to join the disconnected triplets. The two largest disconnected sets can be iteratively merged by computing a loop erased random walk between triplets in these two sets. The random walk can be performed on a trifocal graph in which triplets form nodes, and triplets that share edges (in the original match graph) can be connected via edges. This random walk uses the same edge weights as the random spanning tree generator discussed above.

The solution of the EM method initialized from each spanning tree hypothesis can generate an inlier probability $p(y_{jk}=1)$ for each edge of the pairwise match-graph in the rotation case. For triplets, $p(y_{jk})=\max_{i \in T_{jk}} \{p(y_i)\}$, where $p(y_i)$ is the inlier probability of the i-th triplet (using the notation previously set forth) and $T_{jk}$ are the triplets, pair jk is in. The process can assign $y_{jk}=1$ (i.e. mark edge jk as an inlier) when $p(y_{jk}=1)>0.9$ and otherwise assign $y_{jk}=0$. This binary assignment of the variables in Y is called a configuration. To pick a good solution from among the configurations sampled by this method, a joint log-likelihood L(Y) of the whole configuration can be defined given the individual observations $M_{jk}$ and $T_{jk}$, $$L(Y) = \sum_{jk} \log(p(M_{jk} | y_{jk})p(T_{jk} | y_{jk})) \quad \text{(Eq. 8)}$$

and find $Y^*=\text{argmin}_Y L(Y)$, the most likely configuration. In ambiguous cases, where the cues are weak, some good k configurations can be computed as well.

Both the efficient sampling mechanism as well as the scoring function is based on pairwise match statistics which indicate the likelihood of a match-pair being a correct vs. an erroneous match. Two different cue criteria have been described, namely a missing correspondence cue and an image timestamp cue. However, this probabilistic framework can be extended to other cues as well. For example, cameras, image capture devices, or mobile devices may have other types of sensors in the device, such as inertial sensor or compasses, and these independent measurements can provide additional cues.

Two versions of the technology can be used which differ in the nature of the global geometric consistency analysis operation. One version can utilize pairwise relative rotation estimates derived from the pairwise matches. Here, a joint estimation of global camera rotations as well as the inference of incorrect match pairs is done. Another version can utilize both pairwise relative rotations as well as translations which use three-view partial reconstructions of several triplets of images. In this case, a joint estimation of full camera poses (rotation as well as position) can be performed along with the inference of the set of erroneous matches. Finally, standard structure from motion computation can be performed on the subset of match pairs that have been inferred as correct by the method.

This technology can infer and remove erroneous match pairs, which can occur when the different structure instances are matched based on visual similarity alone. The technology described is based on a unified probabilistic model and sampling-based inferences that incorporate global geometric reasoning with evidence from pairwise image cues.

The present technology can combine global geometric reasoning with additional non-geometric cues derived from pairwise match statistics, such as missing correspondences and time-stamp information, to infer which pairs of matched images are more likely to be correct or erroneous. In other words, images pairs can be detected where different instances of identical or quite similar objects have been matched. More specifically, an expectation maximization (EM)-based method can jointly estimate camera poses and identify the false match-pairs with an efficient sampling method to discover plausible data association hypotheses. The sampling method is informed by geometric and image-based cues. Then the correct data associations can be recovered, even in the presence of large numbers of false pairwise matches.

Some of the functional units described in this specification have been labeled as modules, in order to more particularly emphasize their implementation independence. For example, a module may be implemented as a hardware circuit comprising custom VLSI circuits or gate arrays, off-the-shelf semiconductors such as logic chips, transistors, or other discrete components. A module may also be implemented in programmable hardware devices such as field programmable gate arrays, programmable array logic, programmable logic devices or the like.

Modules may also be implemented in software for execution by various types of processors. An identified module of executable code may, for instance, comprise one or more blocks of computer instructions, which may be organized as an object, procedure, or function. Nevertheless, the executables of an identified module need not be physically located together, but may comprise disparate instructions stored in different locations which comprise the module and achieve the stated purpose for the module when joined logically together.

Indeed, a module of executable code may be a single instruction, or many instructions, and may even be distributed over several different code segments, among different programs, and across several memory devices. Similarly, operational data may be identified and illustrated herein within modules, and may be embodied in any suitable form and organized within any suitable type of data structure. The operational data may be collected as a single data set, or may be distributed over different locations including over different storage devices. The modules may be passive or active, including agents operable to perform desired functions.

Furthermore, the described features, structures, or characteristics may be combined in any suitable manner in one or more embodiments. In the preceding description, numerous specific details were provided, such as examples of various configurations to provide a thorough understanding of embodiments of the described technology. One skilled in the relevant art will recognize, however, that the technology can be practiced without one or more of the specific details, or with other methods, components, devices, etc. In other instances, well-known structures or operations are not shown or described in detail to avoid obscuring aspects of the technology.

Although the subject matter has been described in language specific to structural features and/or operations, it is to be understood that the subject matter defined in the appended claims is not necessarily limited to the specific features and operations described above. Rather, the specific features and acts described above are disclosed as example forms of implementing the claims. Numerous modifications and alternative arrangements can be devised without departing from the spirit and scope of the described technology.

The technology described here can also be stored on a computer readable storage medium that includes volatile and non-volatile, removable and non-removable media implemented with any technology for the storage of information such as computer readable instructions, data structures, program modules, or other data. Computer readable storage media include, but is not limited to, RAM, ROM, EEPROM, flash memory or other memory technology, CD-ROM, digital versatile disks (DVD) or other optical storage, magnetic cassettes, magnetic tapes, magnetic disk storage or other magnetic storage devices, or any other computer storage medium which can be used to store the desired information and described technology.

The devices described herein may also contain communication connections or networking apparatus and networking connections that allow the devices to communicate with other devices. Communication connections are an example of communication media. Communication media typically embodies computer readable instructions, data structures, program modules and other data in a modulated data signal such as a carrier wave or other transport mechanism and includes any information delivery media. The "modulated data signal" means a signal that has one or more of its characteristics set or changed in such a manner as to encode information in the signal. By way of example, and not limitation, communication media includes wired media such as a wired network or direct-wired connection, and wireless media such as acoustic, radio frequency, infrared, and other wireless media. The term computer readable media as used herein includes communication media.

The invention claimed is:

1. A method for performing structure from motion for unordered images of a scene with multiple object instances, comprising:
   obtaining a pairwise match graph using interest point detection to detect interest points in the images of the scene to identify a set of pairwise image matches using the detected interest points;
   estimating multiple metric partial reconstructions by performing independent structure from motion computation on a plurality of match-pairs and match-triplets selected from the pairwise match graph;
   classifying the set of pairwise image matches into a first subset of correct matches and a second subset of erroneous matches using an expectation maximization operation to generate geometrically consistent match labeling hypotheses and a scoring function to evaluate the match labeling hypotheses; and
   performing a structure from motion computation on the first subset of correct matches which have been inferred as correct as a result of the classifying.

2. The method as in claim 1, wherein using the expectation maximization operation to generate geometrically consistent match label hypotheses further comprises utilizing pairwise relative rotation estimates derived from the set of pairwise image matches.

3. The method as in claim 2, further comprising performing a joint estimation of global camera rotations and an inference of incorrect match pairs.

4. The method as in claim 1, wherein using the expectation maximization operation to generate geometrically consistent match label hypotheses further comprises utilizing pairwise relative rotations and translations which use three-view partial constructions of several triplets of the unordered images.

5. The method as in claim 4, further comprising performing a joint estimation of full camera poses with the second subset of erroneous matches.

6. The method as in claim 1, wherein each node in the pairwise match graph represents an image and each edge in the pairwise match graph represents a pair of matched images.

7. The method as in claim 1, wherein obtaining a pairwise match graph further comprises estimating a relative pose, including rotation and translation, of a plurality of cameras with respect to one another.

8. The method as in claim 1, wherein obtaining a pairwise match graph further comprises obtaining a set of geometrically verified two-dimensional (2D) feature point correspondences.

9. The method as in claim 1, wherein classifying the set of pairwise image matches further comprises generating random minimal hypotheses based on randomly sampling spanning trees from the pairwise match graph that is an undirected graph.

10. The method as in claim 1, wherein classifying the set of pairwise image matches further comprises deriving match labeling for the set of pairwise image matches in the pairwise match graph using the expectation maximization operation.

11. The method as in claim 1, wherein classifying the set of pairwise image matches further comprises deriving a match labeling for the set of pairwise image matches in the pairwise match graph using the expectation maximization operation which jointly refines a plurality of camera pose estimates based on pairwise pose measurements.

12. The method as in claim 11, wherein the match labeling includes a binary labeling of the set of pairwise image matches, wherein a binary label for each pairwise image match indicates whether a corresponding pairwise image match is correct or erroneous.

13. The method as in claim 1, wherein classifying the set of pairwise image matches further comprises using the scoring function to evaluate the match labeling hypotheses to identify one of the match labeling hypotheses with a highest score as a correct solution.

14. The method as in claim 1, further comprising obtaining intrinsic camera parameters in advance.

15. The method as in claim 1, wherein the images are unordered and the images are taken by a single camera during a single time period.

16. A system for performing structure from motion from scenes with large duplicate structures, comprising:
- a mass storage device to store images obtained from a camera taken during a single time period;
- a match graph computation module to obtain a pairwise match graph generated by using interest point detection in the images to enable pairwise matching of a set of the images;
- a scene reconstruction module to estimate multiple metric two-view and three-view partial reconstructions by performing independent structure from motion computation on a plurality of image match-pairs and image match-triples selected from the pairwise match graph;
- a classification module to classify a set of image match-pairs selected from the pairwise match graph into a first subset of correct matches and a second subset of erroneous matches using an expectation maximization operation and a scoring function to evaluate a plurality of match labeling hypotheses;
- a global geometry module to apply a global geometric consistency analysis to the image match-pairs; and
- a structure from motion module to perform a structure from motion computation on the first subset of correct matches which have been inferred as correct matches as a result of the classifying.

17. The system as in claim 16, wherein the classification module classifies the set of image match-pairs by generating random minimal hypotheses based on randomly sampling spanning trees from the pairwise match graph that is an undirected graph.

18. The system as in claim 17, wherein the classification module classifies the set of image match-pairs by deriving a match labeling for a set of pairwise matches in the pairwise match graph using the expectation maximization operation that results in a binary labeling of the set of pairwise matches, wherein a label for each one of the pairwise matches indicates whether the each one of the pairwise matches is correct or erroneous.

19. The system as in claim 18, wherein the classification module classifies the set of image match-pairs using the scoring function to identify one of the match labeling hypotheses with a highest score that is a correct solution.

20. A method for performing structure from motion for unordered images of a scene with multiple object instances, comprising:
- obtaining a pairwise match graph using interest point detection in the images of the scene to enable pairwise matching of the images;
- estimating multiple metric two-view and three-view partial reconstructions by performing independent structure from motion computation on match-pairs and match-triplets selected from the pairwise match graph;
- classifying a set of pairwise image matches identified based on the pairwise match graph into a first subset of correct matches and a second subset of erroneous matches by:
  (a) deriving a plurality of match labeling hypotheses for the set of pairwise matches in the pairwise match graph using an expectation maximization operation which jointly refines a plurality of camera pose estimates based on pairwise pose measurements; and
  (b) using a scoring function to evaluate the match labeling hypotheses to identify one of the match labeling hypotheses with a highest score that is a final solution; and
- performing a structure from motion computation on the first subset of correct matches which have been inferred as correct as a result of the classifying.

* * * * *